United States Patent
Stokes et al.

(10) Patent No.: US 10,804,516 B2
(45) Date of Patent: Oct. 13, 2020

(54) EMBOSSED MICROPOROUS MEMBRANE BATTERY SEPARATOR MATERIALS AND METHODS OF MANUFACTURE AND USE THEREOF

(71) Applicant: Celgard, LLC, Charlotte, NC (US)

(72) Inventors: Kristoffer K. Stokes, Charlotte, NC (US); Karl F. Humiston, Fort Mill, SC (US)

(73) Assignee: Celgard, LLC, Charlotte, NC (US)

( * ) Notice: Subject to any disclaimer, the term of this patent is extended or adjusted under 35 U.S.C. 154(b) by 785 days.

(21) Appl. No.: 14/662,629

(22) Filed: Mar. 19, 2015

(65) Prior Publication Data
US 2015/0270520 A1 Sep. 24, 2015

Related U.S. Application Data (60) Provisional application No. 61/955,285, filed on Mar. 19, 2014.

(51) Int. Cl.
*H01M 2/16* (2006.01)
*B29C 48/08* (2019.01)
*H01M 2/18* (2006.01)
*B29C 55/16* (2006.01)
*B29C 55/00* (2006.01)
(Continued)

(52) U.S. Cl.
CPC ......... *H01M 2/162* (2013.01); *B29C 48/0018* (2019.02); *B29C 48/08* (2019.02); *B29C 48/21* (2019.02); *B29C 48/92* (2019.02); *B29C 55/005* (2013.01); *B29C 55/06* (2013.01); *B29C 55/16* (2013.01); *H01M 2/1653* (2013.01); *H01M 2/1686* (2013.01); *H01M 2/18* (2013.01); *B29C 55/023* (2013.01); *B29C 2059/023* (2013.01);
(Continued)

(58) Field of Classification Search
CPC ...... H01M 2/162; H01M 2/1653; H01M 2/18; H01M 2/1686; B29C 47/0021; B29C 47/065; B29C 47/0057; B29C 47/92; B29C 55/005; B29C 55/16; B29C 55/023; B29C 55/06
USPC ....................... 205/350, 517, 703; 204/290.1
See application file for complete search history.

(56) References Cited

U.S. PATENT DOCUMENTS 3,855,046 A 12/1974 Hansen et al.
4,374,888 A 2/1983 Bornslaeger
(Continued)

FOREIGN PATENT DOCUMENTS

JP S 63276533 A 11/1988
JP H02504 A1 1/1990
(Continued)

OTHER PUBLICATIONS

Machine Translation and Abstract in English of JP-2014002866. (Year: 2020).*
(Continued)

*Primary Examiner* — Robert S Jones
*Assistant Examiner* — Claire L Roe
(74) *Attorney, Agent, or Firm* — Hammer & Associates, P.C.

(57) ABSTRACT

Disclosed are embossed microporous membranes, as well as articles (e.g., battery separators, materials, textiles, composites, and laminates) comprising the embossed microporous membranes. Also provided are methods of making and/or using embossed microporous membranes.

11 Claims, 4 Drawing Sheets

(51) Int. Cl.
 B29C 55/06 (2006.01)
 B29C 48/00 (2019.01)
 B29C 48/21 (2019.01)
 B29C 48/92 (2019.01)
 B29L 31/00 (2006.01)
 B29K 23/00 (2006.01)
 B29C 59/02 (2006.01)
 B29C 55/02 (2006.01)

(52) U.S. Cl.
 CPC .................. *B29C 2948/92704* (2019.02); *B29K 2023/14* (2013.01); *B29L 2031/755* (2013.01)

(56) References Cited

U.S. PATENT DOCUMENTS

| | | | |
|---|---|---|---|
| 4,824,718 A | 4/1989 | Hwang | |
| 4,902,553 A * | 2/1990 | Hwang | A61F 13/15731 |
| | | | 428/156 |
| 5,281,413 A | 1/1994 | Abrutyn et al. | |
| 5,620,779 A | 4/1997 | Levy et al. | |
| 5,635,134 A | 6/1997 | Bourne et al. | |
| 5,714,107 A | 2/1998 | Levy et al. | |
| 6,057,061 A | 5/2000 | Callahan et al. | |
| 6,080,507 A | 6/2000 | Yu | |
| 6,540,953 B1 | 4/2003 | Lee et al. | |
| 6,602,593 B1 | 8/2003 | Callahan et al. | |
| 6,719,742 B1 | 4/2004 | McCormack et al. | |
| 8,795,565 B2 | 8/2014 | Wei et al. | |
| 8,858,681 B2 | 10/2014 | Harp | |
| 9,595,703 B2 | 3/2017 | Mitsuoka et al. | |
| 2002/0155234 A1 | 10/2002 | Seth | |
| 2003/0197939 A1 | 10/2003 | Tsuchimoto et al. | |
| 2005/0014063 A1* | 1/2005 | Shi | H01M 2/145 |
| | | | 429/144 |
| 2005/0069723 A1* | 3/2005 | Miller | B29C 55/005 |
| | | | 428/516 |
| 2005/0202163 A1 | 9/2005 | Nguyen et al. | |
| 2006/0147503 A1 | 7/2006 | Floyd | |
| 2006/0148915 A1 | 7/2006 | Floyd et al. | |
| 2007/0196638 A1* | 8/2007 | Wei | B01D 67/0027 |
| | | | 428/304.4 |
| 2008/0118827 A1 | 5/2008 | Call et al. | |
| 2008/0257153 A1* | 10/2008 | Harp | B01D 39/1623 |
| | | | 95/285 |
| 2010/0129720 A1* | 5/2010 | Sako | H01M 2/1653 |
| | | | 429/246 |
| 2010/0279068 A1 | 11/2010 | Cook et al. | |
| 2011/0223486 A1 | 9/2011 | Zhang et al. | |
| 2013/0344373 A1* | 12/2013 | Miller | H01M 2/145 |
| | | | 429/143 |
| 2014/0302374 A1 | 10/2014 | Wei et al. | |

FOREIGN PATENT DOCUMENTS

| | | |
|---|---|---|
| JP | 2005-139227 A | 6/2005 |
| JP | 4535527 B2 | 9/2010 |
| JP | 2014002866 A * | 1/2014 |
| KR | 10-0435233 B1 | 6/2004 |
| WO | WO 2008/053898 | 5/2008 |
| WO | WO 2012/127789 | 9/2012 |
| WO | WO2013146585 A1 | 10/2013 |

OTHER PUBLICATIONS

Robert E. Kesting, "Stretched Semicrystalline Films," Synthetic Polymeric Membranes a Structural Perspective, 2 ed., John Wiley & Sons (New York), (p. 290-297), (1985).

Robert E. Kesting, "Phase-Inversion Membranes," Synthetic Polymeric Membranes a Structural Perspective, 2 ed., John Wiley & Sons (New York), (p. 237-286), (1985).

R. Kesting, "Synthetic Polymeric Membranes, A Structural Perspective," 2 ed., John Wiley & Sons (New York, NY), (1985).

Arora, Pankaj et al. "Battery Separators," printed on Dec. 9, 2019; from Chem. Rev. 2004, 104, 4419-4462.

\* cited by examiner

EMBOSSED MICROPOROUS MEMBRANE BATTERY SEPARATOR MATERIALS AND METHODS OF MANUFACTURE AND USE THEREOF

CROSS-REFERENCE TO RELATED APPLICATIONS

This application claims benefit of and priority to U.S. Provisional Application No. 61/955,285 filed Mar. 19, 2014, which is hereby incorporated herein by reference in its entirety.

FIELD OF THE APPLICATION

In accordance with at least selected embodiments, aspects or objects, this application relates to embossed or calendered battery separators, battery separator membranes or layers, microporous membrane battery separators, microporous membranes, composites or laminates, methods of manufacture, methods of use, products or systems including such separators, layers, membranes, composites, or laminates, and/or the like.

BACKGROUND

Microporous membranes are known, can be made by various processes, and the process by which the membrane is made may have an impact upon the membrane's physical attributes. See, Kesting, R., Synthetic Polymeric Membranes, A structural perspective, Second Edition, John Wiley & Sons, New York, N.Y., (1985). Three commercially viable processes for making microporous membranes include: the dry-stretch process (also known as the CELGARD process), the wet process, and the particle stretch process.

The dry-stretch process refers to a process where pore formation results from stretching a nonporous precursor film. See, Kesting, Ibid. pages 290-297. The dry-stretch process differs from other methods of forming microporous membranes, including the wet process and particle stretch process. Generally, in the wet process (also referred to as the phase inversion process, the extraction process, or the TIPS process), a polymeric raw material is mixed with a processing oil (sometimes referred to as a plasticizer). This mixture is then extruded, and the processing oil is removed (these films may be stretched before or after the removal of the oil). See, Kesting, Ibid. pages 237-286. Generally, in the particle stretch process, a polymeric raw material is mixed with particulate. This mixture is extruded, and pores are formed during stretching when the interface between the polymer and the particulate fractures due to the stretching forces. See, for example, U.S. Pat. Nos. 6,057,061 and 6,080,507. In addition to differences in the processes used to form these membranes, the resulting membranes formed by these processes may be physically distinct.

While microporous membranes, including microporous membranes made by the dry-stretch process, have met with excellent commercial success, there is a need to improve their physical attributes so that they may be used in an even wider spectrum of applications. In particular, there is a need for membranes having improved machine direction (MD) tensile strength, increased transverse direction (TD) tensile strength, increased puncture strength, and decreased MD splitting.

SUMMARY

Provided herein are embossed microporous membranes. The embossed membranes can exhibit improved physical attributes, such as increased MD tensile strength, increased TD tensile strength, increased puncture strength, decreased MD splitting, or a combination thereof, as compared to identical membranes lacking embossing. The embossed microporous membranes can also exhibit decreased membrane thickness.

The embossed microporous membranes can comprise an embossed microporous polymer film. The embossed microporous polymer film can be formed from any suitable polymer or blend of polymers. For example, the embossed microporous polymer film can be formed from a polymer selected from the group consisting of polyolefins, fluorocarbons, polyamides, polyesters, polyacetals (or polyoxymethylenes), polysulfides, polyvinyl alcohols, co-polymers thereof, and combinations thereof. In some embodiments, the embossed microporous polymer film can be formed from a polyolefin that comprises polypropylene, polyethylene, or a combination thereof. In certain embodiments, the polyolefin can comprise an impact copolymer polypropylene.

In some embodiments, the embossed microporous polymer film can have a thickness of from 2 microns to 20 microns (e.g., a thickness of from 3 microns to 12 microns, or a thickness of from 5 microns to 10 microns).

In some embodiments, the embossed microporous polymer film can have a porosity of from 20% to 65% (e.g., a porosity of from 25% to 50%, or a porosity of from 30% to 40%). The embossed microporous polymer film can have a JIS Gurley of 500 or less. For example, in some cases, the embossed microporous polymer film can have a JIS Gurley of from 80 seconds to 500 seconds (e.g., a JIS Gurley of from 100 seconds to 450 seconds, or a JIS Gurley of from 150 seconds to 400 seconds).

In some embodiments, the embossed microporous polymer film can exhibit a ratio of MD tensile strength to TD tensile strength of from 0.5 to 5.0. In some embodiments, the embossed microporous polymer film can have a TD tensile strength of at least 250 kg/cm$^2$ (e.g., a TD tensile strength of at least 300 kg/cm$^2$, such as a TD tensile strength of from 250 kg/cm$^2$ to 1000 kg/cm$^2$, or a TD tensile strength of from 300 kg/cm$^2$ to 1000 kg/cm$^2$). In some embodiments, the embossed microporous polymer film can have an MD tensile strength of at least 1000 kg/cm$^2$ (e.g., an MD tensile strength of from 1000 kg/cm$^2$ to 2000 kg/cm$^2$). In some embodiments, the embossed microporous polymer film can have a TD shrinkage of less than 6.0% at 90° C. and less than 15.0% at 120° C. In some embodiments, the embossed microporous polymer film can have a puncture strength of from 200 g to 325 g.

In some embodiments, the embossed microporous polymer film can comprise a multi-ply embossed microporous polymer film (e.g., a bi-layer polymer film, a tri-layer polymer film, or a polymer film comprising more than three layers). Optionally, in some embodiments, the embossed microporous membrane can further comprise a nonwoven (e.g., a spunbond or meltblown nonwoven material) disposed on a side of the embossed microporous polymer film. In these embodiments, the microporous polymer film and the nonwoven can be combined through any suitable process, such as adhesive or thermal lamination, embossing, calendering, or combinations thereof.

The embossed microporous membranes can be prepared by embossing a suitable microporous polymer film. The microporous polymer film can be made by a dry-stretch process and may include a plurality of pores having a substantially round shape. The microporous polymer film can exhibit a ratio of machine direction tensile strength to transverse direction tensile strength of from 0.5 to 5.0.

The microporous polymer film can be formed from any suitable polymer or blend of polymers. For example, the microporous polymer film can be formed from a polymer selected from the group consisting of polyolefins, fluorocarbons, polyamides, polyesters, polyacetals (or polyoxymethylenes), polysulfides, polyvinyl alcohols, co-polymers thereof, and combinations thereof. In some embodiments, the microporous polymer film can be formed from a polyolefin that comprises polypropylene, polyethylene, or a combination thereof. In certain embodiments, the polyolefin can comprise an impact copolymer polypropylene.

In some embodiments, the microporous polymer film, before embossing, can have a thickness of at least 8 microns (e.g., a thickness of from 8 microns to 80 microns). In some embodiments, the microporous polymer film, before embossing can have a TD tensile strength of at least 175 kg/cm$^2$ (e.g., a TD tensile strength of at least 225 kg/cm$^2$). In some embodiments, the microporous polymer film, before embossing, can have a TD shrinkage of less than 6.0% at 90° C. and less than 15.0% at 120° C.

The microporous polymer film, before embossing, can have a porosity of from 20% to 90% (e.g., a porosity of from 20% to 80%, a porosity of from 40% to 90%, or a porosity of from 65% to 90%). In some embodiments, the plurality of pores in the microporous polymer film, before embossing, can have an average pore size of from 0.03 microns to 0.50 microns and an aspect ratio of from 0.75 to 1.25. In some cases, the microporous polymer film, before embossing, can have a mean flow pore diameter of at least 0.04 microns (e.g., a mean flow pore diameter of at least 0.05 microns). In some cases, the microporous polymer film, before embossing, can have an Aquapore size of at least 0.06 microns (e.g., at least 0.08 microns). In some cases, the microporous polymer film, before embossing, can have a JIS Gurley of less than 100. In certain cases, the microporous polymer film, before embossing, can have a JIS Gurley of less than 60.

In some embodiments, the microporous polymer film, before embossing, can comprise a multi-ply microporous polymer film (e.g., a bi-layer polymer film, a tri-layer polymer film, or a polymer film comprising more than three layers).

In some embodiments, embossing the microporous polymer film can comprise embossing the microporous polymer film using a patterned embossing roller. The patterned embossing roller can impart an embossing pattern to the embossed microporous membrane. Accordingly, in some embodiments, the embossed microporous membranes can comprise an embossed pattern that includes crushed or reduced thickness regions formed by the embossing process. The embossed microporous membranes can comprise any suitable embossing pattern. In some examples, the embossed microporous membrane can comprise an embossing pattern selected from the group consisting of embossed horizontal lines running parallel to the TD of the film, an embossed crosshatch-type pattern at an angle relative to the MD and TD of the film, embossed circles in a pseudorandom pattern, a pseudorandom floral pattern, and combinations thereof. In certain embodiments, the embossing pattern can comprise embossed horizontal lines running parallel to the TD of the film. The horizontal lines can have a line width of from 2 microns to 10 microns. The horizontal lines can have a spacing in the MD of from one to ten times the line width.

In some embodiments, embossing the microporous polymer film can comprise calendering, crushing or compressing at least portions of the microporous polymer film. Calendering the microporous polymer film can comprise calendering the microporous polymer film using unpatterned (e.g., smooth) embossing rollers. In these embodiments, the embossed microporous membrane can have a substantially uniform crushed or reduced thickness.

Also provided are methods of making and/or using embossed microporous membranes. The methods can comprise (i) extruding a polymer to form a nonporous precursor; (ii) biaxially stretching the non-porous precursor to form a biaxially stretched membrane, wherein the biaxial stretching comprises a machine direction stretching and a transverse direction stretching, the transverse direction stretching comprising a simultaneous controlled machine direction relax; and (iii) embossing the biaxially stretched membrane to form the embossed microporous membrane.

In some embodiments, step (iii) of embossing the biaxially stretched membrane can comprise reducing the thickness of the biaxially stretched membrane. In these cases, the thickness of the embossed microporous membrane can be from 35% to 75% (e.g., from 35% to 55%) of the thickness of the biaxially stretched membrane. In some embodiments, step (iii) of embossing the biaxially stretched membrane can comprise embossing the biaxially stretched membrane using a patterned embossing roller. In these embodiments, the patterned embossing roller can impart an embossing pattern to the embossed microporous membrane. In some embodiments, step (iii) of embossing the biaxially stretched membrane can comprise calendering the biaxially stretched membrane. Calendering the biaxially stretched membrane can comprise calendering the biaxially stretched membrane using unpatterned (e.g., smooth) embossing rollers. In these embodiments, the embossed microporous membrane may not comprise an embossing pattern (e.g., the embossed microporous membrane can have a substantially constant thickness (e.g., ±15%, or ±10%) across the membrane).

In some cases, the methods can further comprise annealing the nonporous precursor between step (i) and step (ii) at a temperature of from $T_m$-80° C. to $T_m$-10° C. (where $T_m$ is the melting temperature of the polymer). In some embodiments, the total machine direction stretch in step (ii) can be from 50-500%, the total transverse direction stretch can be from 100-1200%, the machine direction relax from the transverse direction stretch can be from 5-80%, or a combination thereof. In some embodiments, the methods can further comprise providing a nonwoven on a side of the biaxially stretched membrane.

Also provided are articles, including battery separators (single or multiple ply or layer separators), materials, textiles, composites, and laminates, comprising the embossed microporous membranes described herein. Also provided are batteries (e.g., lithium batteries) comprising the battery separators described herein. The batteries can comprise an anode, a cathode, and the battery separator comprising an embossed microporous membrane described herein disposed between the anode and the cathode. Also provided are other products or systems such as garments, HVAC materials, fuel cell humidity control membranes, proton exchange membranes, separation materials, filtration materials, and the like.

DETAILED DESCRIPTION

Provided herein are embossed microporous membranes. The embossed membranes can exhibit improved physical attributes, such as increased MD tensile strength, increased TD tensile strength, increased puncture strength, decreased MD splitting, or a combination thereof, as compared to identical membranes lacking embossing. The embossed microporous membranes can also exhibit decreased membrane thickness.

The embossed microporous membranes can be prepared by embossing a suitable microporous polymer film. Suitable microporous polymer films that can be embossed to form the embossed microporous membranes described above include microporous films made by dry-stretch processes, such as those described in U.S. Pat. No. 6,602,593 as well as those described in U.S. Patent Application Publication Nos. 2007/0196638, 2008/0118827, 2011/0223486, and 2014/0302374, all of which are hereby incorporated by reference.

In some cases, the microporous polymer film can be a uniaxially-oriented Celgard membrane, such as those described in U.S. Pat. No. 6,602,593. In other cases, the microporous polymer film can be a biaxially-oriented Celgard membrane, such as those disclosed in U.S. Patent Application Publication Nos. 2007/0196638 and 2011/0223486. Such biaxially-oriented membranes might, in some instances, perform better as battery separators than uniaxially-oriented Celgard membranes because biaxial orientation increases the membranes' porosity. Moreover, biaxially-oriented Celgard membranes made from block copolymers of polyethylene and polypropylene may have the additional advantage of exceptionally pleasant touch or hand. However, uniaxially-oriented embossed microporous membranes can also be used to prepare embossed microporous membranes, including battery separators.

In one embodiment, the microporous polymer film can include a membrane made by a dry-stretch process. The membrane can comprise a microporous polymer film made by a dry-stretch process and including a plurality of pores. In some instances, the pores may be characterized as substantially round shaped. In some embodiments, the plurality of pores in the microporous polymer film or membrane can have an average pore size, as measured by SEM, of from 0.03 microns to 0.50 microns. Further, the pore shape can be characterized by an aspect ratio, the ratio of the length to the width of the pore. In some embodiments, the aspect ratio of the pores can range from 0.75 to 1.25.

The microporous polymer film or membrane can be formed from one or more thermoplastic polymers. These polymers can be semi-crystalline. In one embodiment, the semi-crystalline polymer can have a crystallinity in the range of 20 to 80%. Examples of suitable polymers include polyolefins, fluorocarbons, polyamides, polyesters, polyacetals (or polyoxymethylenes), polysulfides, polyvinyl alcohols, co-polymers thereof, and combinations thereof. Polyolefins may include polyethylenes (LDPE, LLDPE, HDPE, UHMWPE), polypropylene, polybutene, polymethylpentene, co-polymers thereof, and blends thereof. Fluorocarbons may include polytetrafluoroethylene (PTFE), polychlorotrifluoroethylene (PCTFE), fluorinated ethylene propylene (FEP), ethylene chlorotrifluoroethylene (ECTFE), ethylene tetrafluoroethylene (ETFE), polyvinylidene fluoride (PVDF), polyvinylfluoride (PVF), perfluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethylene terephthalate (PCT), polyethylene naphthalate (PEN), and liquid crystal polymers (LCP). Polysulfides include, but are not limited to, polyphenylsulfide, polyethylene sulfide, co-polymers thereof, and blends thereof. Polyvinyl alcohols include, but are not limited to, ethylene-vinyl alcohol, co-polymers thereof, and blends thereof.

In certain embodiments, the thermoplastic polymer can be a polyolefin, such as a polypropylene, a polyethylene, a polybutylene, a poly(4-methyl-1-pentene), or a combination thereof. In some embodiments, the thermoplastic polymer is a polyolefin selected from the group consisting of polypropylene homopolymers (e.g., atactic polypropylene, isotactic polypropylene, and syndiotactic polypropylene), polypropylene copolymers (e.g., polypropylene random copolymers), polypropylene impact copolymers, polyethylene, polyethylene copolymers, polybutylene, poly(4-methyl-1-pentene), and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount (e.g., an amount of less than 10 wt. %, such as from 1 to 7 wt. %).

In certain embodiments, the polyolefin can comprise an impact copolymer polypropylene. Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from 5 to 25 wt. %.

In some embodiments, the thermoplastic polymer can be a polyethylene. Suitable polyethylenes include, but are not limited to, low density polyethylene, linear low density polyethylene, medium density polyethylene, high density polyethylene, and combinations thereof. In certain embodiments, the thermoplastic polymer can be selected from the group consisting of medium density polyethylene, high density polyethylene, and mixtures thereof. In certain embodiments, the thermoplastic polymer can be a high density polyethylene.

In other select embodiments, the microporous polymer film or membrane can further include other ingredients. For example, the microporous polymer film or membrane can further include fillers (e.g., inert particulates used to reduce the cost of the film, but otherwise having no significant impact on the manufacture of the membrane or its physical properties), anti-static agents, anti-blocking agents, anti-oxidants, lubricants (e.g., to facilitate manufacture), and the like.

In other embodiments, various materials may be added to the polymers to modify or enhance the properties of resulting membranes. Such materials include, but are not limited to: (1) polyolefins or polyolefin oligomers with a melting temperature less than 130° C.; (2) mineral fillers including, but not limited to, calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, and blends thereof; (3) elastomers including, but not limited to, ethylene-propylene (EPR), ethylene-propylene-diene (EPDM), styrene-butadiene (SBR), styrene isoprene (SIR), ethylidene norbornene (ENB), epoxy, and polyurethane and blends thereof; (4) wetting agents including, but not limited to, ethoxylated alcohols, primary polymeric carboxylic acids, glycols (e.g., polypropylene glycol and polyethylene glycols), functionalized polyolefins etc.; (5) lubricants, for example, silicone, fluoropolymers, Kemamide®, oleamide, stearamide, erucamide, calcium stearate, or other metallic stearate; (6) flame retardants for example, brominated flame retardants, ammonium phosphate, ammonium hydroxide, alumina trihydrate, and phosphate ester; (7) cross-linking or coupling agents; (8) polymer processing aid; and (9) any type of nucleating agents including beta-nucleating agent for polypropylene.

In some embodiments, the microporous polymer film or membrane, before embossing, can have a thickness of at least 8 microns (e.g., a thickness of from 8 microns to 80 microns).

In some embodiments, the microporous polymer film or membrane, before embossing, can have an MD tensile strength of at least 600 kg/cm$^2$ (e.g., at least 650 kg/cm$^2$, at least 700 kg/cm$^2$, at least 750 kg/cm$^2$, at least 800 kg/cm$^2$, at least 850 kg/cm$^2$, at least 900 kg/cm$^2$, at least 950 kg/cm$^2$, at least 1000 kg/cm$^2$, at least 1100 kg/cm$^2$, at least 1200 kg/cm$^2$, at least 1300 kg/cm$^2$, or at least 1400 kg/cm$^2$). In some embodiments, the microporous polymer film or membrane, before embossing, can have an MD tensile strength of 1500 kg/cm$^2$ or less (e.g., 1400 kg/cm$^2$ or less, 1300 kg/cm$^2$ or less, 1200 kg/cm$^2$ or less, 1100 kg/cm$^2$ or less, 1000 kg/cm$^2$ or less, 950 kg/cm$^2$ or less, 900 kg/cm$^2$ or less, 850 kg/cm$^2$ or less, 800 kg/cm$^2$ or less, 750 kg/cm$^2$ or less, 700 kg/cm$^2$ or less, or 650 kg/cm$^2$ or less).

The microporous polymer film or membrane, before embossing, can have an MD tensile strength ranging from any of the minimum values described above to any of the maximum values described above. For example, the microporous polymer film or membrane, before embossing, can have an MD tensile strength of from 600 kg/cm$^2$ to 1500 kg/cm$^2$.

In some embodiments, the microporous polymer film or membrane, before embossing, can have a TD tensile strength of at least 175 kg/cm$^2$ (e.g., at least 200 kg/cm$^2$, at least 225 kg/cm$^2$, at least 250 kg/cm$^2$, at least 275 kg/cm$^2$, at least 300 kg/cm$^2$, at least 350 kg/cm$^2$, at least 400 kg/cm$^2$, at least 500 kg/cm$^2$, at least 600 kg/cm$^2$, at least 700 kg/cm$^2$, at least 800 kg/cm$^2$, at least 900 kg/cm$^2$, or at least 1000 kg/cm$^2$). In some embodiments, the microporous polymer film or membrane can have a TD tensile strength of 1100 kg/cm$^2$ or less (e.g., 1000 kg/cm$^2$ or less, 900 kg/cm$^2$ or less, 800 kg/cm$^2$ or less, 700 kg/cm$^2$ or less, 600 kg/cm$^2$ or less, 500 kg/cm$^2$ or less, 400 kg/cm$^2$ or less, 350 kg/cm$^2$ or less, 300 kg/cm$^2$ or less, 275 kg/cm$^2$ or less, 250 kg/cm$^2$ or less, 225 kg/cm$^2$ or less, or 200 kg/cm$^2$ or less).

The microporous polymer film or membrane, before embossing, can have a TD tensile strength ranging from any of the minimum values described above to any of the maximum values described above. For example, the microporous polymer film or membrane can have a TD tensile strength of from 175 kg/cm$^2$ to 1100 kg/cm$^2$.

In some embodiments, the ratio of the MD tensile strength of the microporous polymer film or membrane to the TD tensile strength of the microporous polymer film or membrane can be at least 0.5 (e.g., at least 1.0, at least 2.0, at least 3.0, at least 4.0, or at least 5.0). In some embodiments, the ratio of the MD tensile strength of the microporous polymer film or membrane to the TD tensile strength of the microporous polymer film or membrane can be 6.0 or less (e.g., 5.0 or less, 4.0 or less, 3.0 or less, 2.0 or less, or 1.0 or less).

The ratio of the MD tensile strength of the microporous polymer film or membrane to the TD tensile strength of the microporous polymer film or membrane can range from any of the minimum values described above to any of the maximum values described above. For example, the ratio of the MD tensile strength of the microporous polymer film or membrane to the TD tensile strength of the microporous polymer film or membrane can be from 0.5 to 6.0 (e.g., from 0.5 to 5.0, or from 0.5 to 4.0).

In certain embodiments, the microporous polymer film or membrane can have a TD shrinkage of less than 6.0% at 90° C. and less than 15.0% at 120° C.

In some embodiments, the microporous polymer film or membrane can have a porosity of at least 20% (e.g., at least 40%, at least 50%, at least 65%, or at least 80%).

In some embodiments, the microporous polymer film or membrane can have a porosity of 90% or less (e.g., 80% or less, 65% or less, 50% or less, or 40% or less).

The microporous polymer film or membrane can have a porosity ranging from any of the minimum values described above to any of the maximum values described above. For example, the microporous polymer film or membrane can have a porosity of from 20% to 90% (e.g., a porosity of from 20% to 80%, a porosity of from 40% to 90%, or a porosity of from 65% to 90%).

In some embodiments, the microporous polymer film or membrane can have a mean flow pore diameter (measured with Capillary Flow analysis using the ASTM F316-86 standard method) of at least 0.04 microns (e.g., a mean flow pore diameter of at least 0.05 microns).

In some embodiments, the microporous polymer film or membrane can have an Aquapore size (measured using the Aquapore available through PMI (Porous Materials Inc.)) of at least 0.06 microns (e.g., at least 0.08 microns).

In some cases, the microporous polymer film or membrane can have a JIS Gurley of less than 100 seconds. In some cases, the microporous polymer film or membrane can have a JIS Gurley of less than 80 seconds. In certain cases, the microporous polymer film or membrane can have a JIS Gurley of less than 60 seconds.

In some embodiments, the microporous polymer film or membrane can have a hydrohead pressure (measured using the ASTM D3393-91 standard method) of greater than 140 psi.

The microporous polymer film or membrane can comprise a single-ply microporous polymer film or a multi-ply microporous polymer film (e.g., a bilayer film, a trilayer film, or a film comprising more than three layers). Multi-ply films can be prepared using standard lamination methods known in the art as discussed in more detail below. Multi-ply films can also be prepared using co-extrusion methods known in the art and discussed in more detail below. Multi-ply films can be made of plies of the same materials or of differing materials. In one embodiment, the microporous polymer film or membrane can comprise a polypropylene-polyethylene-polypropylene trilayer film.

Optionally, in some embodiments, the microporous polymer film or membrane can further comprise a nonwoven (e.g., a spunbond or meltblown nonwoven material) disposed on a side of the microporous polymer film or membrane. The nonwoven can be, for example, a polypropylene nonwoven. In these embodiments, the microporous polymer film and the nonwoven can be combined through any suitable process, such as adhesive or thermal lamination, embossing, calendering, or combinations thereof.

In one example embodiment, a microporous polymer film or membrane can comprise a Celgard® microporous membrane, particularly embossed block copolymer Z-Series membranes.

The embossed microporous membranes can be prepared by embossing a suitable microporous polymer film or membrane using any suitable embossing method. Methods of embossing suitable microporous polymer films are discussed in more detail below.

In some embodiments, embossing the microporous polymer film or membrane can comprise embossing the microporous polymer film using a patterned embossing roller. The patterned embossing roller can impart an embossing pattern to the embossed microporous membrane. Accordingly, in some embodiments, the embossed microporous membranes can comprise an embossed pattern that includes crushed or reduced thickness regions formed by the embossing process. In these cases, the embossed microporous membranes can comprise any suitable embossing pattern.

The embossing pattern can be selected based on the intended application for the microporous membrane. For example, the embossing pattern can be selected so as to decrease MD splitting. The embossing pattern can also be selected so as to blunt any propagating crack tip for a tear in the microporous membrane. In cases where the membranes will be used as battery separators, the embossing pattern can also be selected so as to not adversely impact the performance of an assembled battery incorporating the separator. For example, the embossed pattern can include sufficient number of regions that retain their original thickness and porosity so as to provide a membrane with suitable properties (e.g., porosity) for use as a battery separator.

In some cases, the embossing pattern can be selected for aesthetic and/or branding reasons. For example, the embossing pattern can include a company name, logo, or brand and/or an aesthetically pleasing pattern (e.g., a floral pattern). Examples of embossing patterns are described in, for example, U.S. Pat. No. 3,855,046 to Hansen et al.; U.S. Pat. No. 4,374,888 to Bomslaeger; U.S. Pat. No. 5,635,134 to Bourne et al.; U.S. Pat. No. 5,620,779 to Levy et al.; and U.S. Pat. No. 5,714,107 to Levy et al.

In some embodiments, the embossed microporous membrane can comprise an embossing pattern selected from the group consisting of embossed horizontal lines running parallel to the TD of the membrane, an embossed crosshatch-type pattern at an angle relative to the MD and TD of the membrane, embossed circles in a pseudorandom pattern, a pseudorandom floral pattern, and combinations thereof. In certain embodiments, the embossing pattern can comprise embossed horizontal lines running parallel to the TD of the membrane. This embossing pattern may reduce MD direction splitting and/or blunt any propagating crack tip for a tear in the microporous membrane.

In some embodiments, the embossed horizontal lines can have a line width of less than 100 microns (e.g., less than 90 microns, less than 80 microns, less than 70 microns, less than 60 microns, less than 50 microns, less than 40 microns, less than 30 microns, less than 25 microns, less than 20 microns, less than 15 microns, less than 10 microns, or less than 5 microns). In some embodiments, the embossed horizontal lines can have a line width of at least 1 micron (e.g., at least 2 microns, at least 5 microns, at least 10 microns, at least 15 microns, at least 20 microns, at least 25 microns, at least 30 microns, at least 35 microns, at least 40 microns, at least 50 microns, at least 60 microns, at least 70 microns, at least 80 microns, or at least 90 microns).

The embossed horizontal lines can have a line width ranging from any of the minimum values described above to any of the maximum values described above. For example, the embossed horizontal lines can have a line width of from 1 micron to 100 microns (e.g., from 2 microns to 100 microns, from 2 microns to 25 microns, or from 2 microns to 10 microns). In some cases, the embossed horizontal lines can have a spacing in the MD (i.e., a distance between adjacent parallel horizontal lines along the MD of the membrane) of from one to ten times the line width.

In the case of an embossed crosshatch-type pattern at an angle relative to the MD and TD of the film, the crosshatch-type pattern can be formed from linear segments having the dimensions described above. In the case of embossed circles in a pseudorandom pattern, the circles can have diameters equal to the dimensions described above.

The embossing process can involve a partial crush of the membrane in the non-pattern area (or vice versa). The pattern area, which may be left by the negative pattern impression on the embossing roll, can retain its original thickness, porosity, as well as its characteristic milky white color (the white color results from the scattering of light within the pores of the film). For example, and not limited thereto, the partially crushed areas can be crushed from their original thickness to a final thickness that is from 75% to 35% of the original thickness (e.g., from 75% to 55% of the original thickness, from 55% to 35% of the original thickness, from 40% to 30% of the original thickness, or from 70% to 65% of the original thickness). By way of example, in one embodiment, the partially crushed areas can be crushed an original thickness of approximately 19-20 microns to a final thickness of approximately 13 microns. The crushed or partially crushed areas may be non-porous or partially porous or slightly less porous than the uncrushed or not partially crushed areas.

Examples of improvements that can accompany embossing of the microporous membranes include, but are not limited to, the creation of a pattern in the membrane (e.g., in the battery separator or textile) through embossing which involves partial crushing of the membrane in the pattern or non-pattern area; enhancement, through the translucency which results from partial crushing of the membrane; improved tactile feel; the increase in the membrane's strength through partial crushing (the improvement can be seen in both the machine direction and transverse direction tensile strength and in puncture strength); stronger edges or portions; the like; and combinations thereof.

In some embodiments, embossing the microporous polymer film can comprise calendering, crushing or compressing the microporous polymer film using unpatterned (e.g., smooth) embossing rollers. In these embodiments, the embossed microporous membrane can have a substantially uniform crushed or reduced thickness. In these embodiments, the microporous polymer film or membrane can be partially crushed from its original thickness to a final thickness that is from 75% to 35% of the original thickness (e.g., from 75% to 55% of the original thickness, from 55% to 35% of the original thickness, from 40% to 30% of the original thickness, or from 70% to 65% of the original thickness).

The embossed microporous polymer film can have a thickness of at least 2 microns (e.g., at least 3 microns, at least 4 microns, at least 5 microns, at least 6 microns, at least 7 microns, at least 8 microns, at least 9 microns, at least 10 microns, at least 11 microns, at least 12 microns, at least 13 microns, at least 14 microns, at least 15 microns, at least 16 microns, at least 17 microns, at least 18 microns, or at least 19 microns). The embossed microporous polymer film can have a thickness of 20 microns or less (e.g., 19 microns or less, 18 microns or less, 17 microns or less, 16 microns or less, 15 microns or less, 14 microns or less, 13 microns or less, 12 microns or less, 11 microns or less, 10 microns or less, 9 microns or less, 8 microns or less, 7 microns or less, 6 microns or less, 5 microns or less, 4 microns or less, or 3 microns or less).

The embossed microporous polymer film can have a thickness ranging from any of the minimum values described above to any of the maximum values described above. For example, the embossed microporous polymer film can have a thickness of from 2 microns to 20 microns (e.g., a thickness of from 3 microns to 12 microns, a thickness of from 2 microns to 8 microns, a thickness of from 3 microns to 8 microns, or a thickness of from 5 microns to 10 microns).

In some embodiments, the embossed microporous polymer film can have a porosity of at least 20% (e.g., at least 25%, at least 30%, at least 35%, at least 40%, at least 45%, at least 50%, at least 55%, or at least 65%). In some embodiments, the embossed microporous polymer film can have a porosity of 65% or less (e.g., 60% or less, 55% or less, 50% or less, 45% or less, 40% or less, 35% or less, 30% or less, or 25% or less).

The embossed microporous polymer film can have a porosity ranging from any of the minimum values described above to any of the maximum values described above. For example, the embossed microporous polymer film can have a porosity of from 20% to 60% (e.g., a porosity of from 20% to 50%, a porosity of from 25% to 50%, a porosity of from 30% to 55%, or a porosity of from 30% to 40%).

In some embodiments, the embossed microporous polymer film can have a JIS Gurley of at least 80 seconds (e.g., at least 90 seconds, at least 100 seconds, at least 125 seconds, at least 150 seconds, at least 175 seconds, at least 200 seconds, at least 225 seconds, at least 250 seconds, at least 275 seconds, at least 300 seconds, at least 325 seconds, at least 350 seconds, at least 375 seconds, at least 400 seconds, at least 425 seconds, at least 450 seconds, or at least 475 seconds). In some embodiments, the embossed microporous polymer film can have a JIS Gurley of 500 seconds or less (e.g., 475 seconds or less, 450 seconds or less, 425 seconds or less, 400 seconds or less, 375 seconds or less, 350 seconds or less, 325 seconds or less, 300 seconds or less, 275 seconds or less, 250 seconds or less, 225 seconds or less, 200 seconds or less, 175 seconds or less, 150 seconds or less, 125 seconds or less, 100 seconds or less, or 90 seconds or less).

The embossed microporous polymer film can have a JIS Gurley ranging from any of the minimum values described above to any of the maximum values described above. For example, the embossed microporous polymer film can have a JIS Gurley of from 80 seconds to 500 seconds (e.g., a JIS Gurley of from 100 seconds to 450 seconds, or a JIS Gurley of from 150 seconds to 400 seconds).

In some embodiments, the embossed microporous polymer film can have an MD tensile strength of at least 1100 kg/cm$^2$ (e.g., at least 1100 kg/cm$^2$, at least 1200 kg/cm$^2$, at least 1300 kg/cm$^2$, at least 1400 kg/cm$^2$, at least 1500 kg/cm$^2$, at least 1600 kg/cm$^2$, at least 1700 kg/cm$^2$, at least 1800 kg/cm$^2$, or at least 1900 kg/cm$^2$). In some embodiments, the embossed microporous polymer film can have an MD tensile strength of 2000 kg/cm$^2$ or less (e.g., 1900 kg/cm$^2$ or less, 1800 kg/cm$^2$ or less, 1700 kg/cm$^2$ or less, 1600 kg/cm$^2$ or less, 1500 kg/cm$^2$ or less, 1400 kg/cm$^2$ or less, 1300 kg/cm$^2$ or less, 1200 kg/cm$^2$ or less, or 1100 kg/cm$^2$ or less).

The embossed microporous polymer film can have an MD tensile strength ranging from any of the minimum values described above to any of the maximum values described above. For example, the embossed microporous polymer film can have a MD tensile strength of from 1000 kg/cm$^2$ to 2000 kg/cm$^2$.

In some embodiments, the embossed microporous polymer film can have a TD tensile strength of at least 250 kg/cm$^2$ (e.g., at least 300 kg/cm$^2$, at least 350 kg/cm$^2$, at least 400 kg/cm$^2$, at least 450 kg/cm$^2$, at least 500 kg/cm$^2$, at least 600 kg/cm$^2$, at least 700 kg/cm$^2$, at least 800 kg/cm$^2$, or at least 900 kg/cm$^2$). In some embodiments, the embossed microporous polymer film can have a TD tensile strength of 1000 kg/cm$^2$ or less (e.g., 900 kg/cm$^2$ or less, 800 kg/cm$^2$ or less, 700 kg/cm$^2$ or less, 600 kg/cm$^2$ or less, 500 kg/cm$^2$ or less, 450 kg/cm$^2$ or less, 400 kg/cm$^2$ or less, 350 kg/cm$^2$ or less, or 300 kg/cm$^2$ or less).

The embossed microporous polymer film can have a TD tensile strength ranging from any of the minimum values described above to any of the maximum values described above. For example, the embossed microporous polymer film can have a TD tensile strength of from 250 kg/cm$^2$ to 1000 kg/cm$^2$ (e.g., a TD tensile strength of from 250 kg/cm$^2$ to 900 kg/cm$^2$, or a TD tensile strength of from 300 kg/cm$^2$ to 1000 kg/cm$^2$).

In some embodiments, the ratio of the MD tensile strength of the embossed microporous polymer film to the TD tensile strength of the embossed microporous polymer film can be at least 0.5 (e.g., at least 1.0, at least 2.0, at least 3.0, at least 4.0, or at least 5.0). In some embodiments, the ratio of the MD tensile strength of the embossed microporous polymer film to the TD tensile strength of the embossed microporous polymer film can be 6.0 or less (e.g., 5.0 or less, 4.0 or less, 3.0 or less, 2.0 or less, or 1.0 or less).

The ratio of the MD tensile strength of the embossed microporous polymer film to the TD tensile strength of the embossed microporous polymer film can range from any of the minimum values described above to any of the maximum values described above. For example, the ratio of the MD tensile strength of the embossed microporous polymer film to the TD tensile strength of the embossed microporous polymer film can be from 0.5 to 6.0 (e.g., from 0.5 to 5.0, or from 0.5 to 4.0).

In certain embodiments, the embossed microporous polymer film can have a TD shrinkage of less than 6.0% at 90° C. and less than 15.0% at 120° C.

In some embodiments, the embossed microporous polymer film can have a puncture strength of at least 200 g (e.g., at least 225 g, at least 250 g, at least 275 g, or at least 300 g). In some embodiments, the embossed microporous polymer film can have a puncture strength of 325 g or less (e.g., 300 g or less, 275 g or less, 250 g or less, or 225 g or less).

The embossed microporous polymer film can have a puncture strength ranging from any of the minimum values described above to any of the maximum values described above. For example, the embossed microporous polymer film can have a puncture strength of from 200 g to 325 g.

In some embodiments, the embossed microporous polymer film can comprise a multi-ply embossed microporous polymer film (e.g., a bi-layer polymer film a tri-layer polymer film, or a polymer film comprising more than three layers). Optionally, in some embodiments, the embossed microporous membrane can further comprise a nonwoven (e.g., a spunbond or meltblown nonwoven material) disposed on a side of the embossed microporous polymer film. In these embodiments, the embossed microporous polymer film and the nonwoven can be combined through any suitable process, such as adhesive or thermal lamination, embossing, calendering, or combinations thereof.

Methods

As generally discussed above, the embossed microporous membranes described herein can be made by embossing microporous membranes prepared using conventional methods. Methods can involve preparing a suitable microporous membrane or film, and embossing the microporous membrane or film to form the embossed microporous membrane.

In some cases, methods can comprise forming a microporous membrane by a dry-stretch process where a nonporous precursor is extruded and then is biaxially stretched (i.e., not only stretched in the machine direction, but also in the transverse machine direction). This process is discussed in great detail in U.S. Patent Application Publication Nos. 2007/0196638 and 2011/0223486, which are incorporated herein by reference, and discussed further below.

In general, the process for making the microporous membrane can include the steps of extruding a nonporous precursor, and then biaxially stretching the nonporous precursor. Optionally, the nonporous precursor may be annealed prior to stretching. Optionally, the nonporous precursor can be stretched in the machine direction prior to biaxial stretching. In one embodiment, the biaxial stretching includes a machine direction stretch and a transverse direction with a simultaneous controlled machine direction relax. The machine direction stretch and the transverse direction stretch can be simultaneous or sequential. In one embodiment, the machine direction stretch is followed by the transverse direction stretch with the simultaneous machine direction relax. This process is discussed in greater detail below.

Extrusion can be generally conventional (conventional refers to conventional for a dry-stretch process). The extruder can have a slot die (for flat precursor) or an annular die (for parison precursor). In the case of the latter, an inflated parison technique can be employed (e.g., a blow up ratio (BUR)). However, the birefringence of the nonporous precursor may not have to be as high as in the conventional dry-stretch process. For example, in the conventional dry-stretch process to produce a membrane for the embossed battery separator with a >35% porosity from a polypropylene resin, the birefringence of the precursor may be >0.0130; while with the instant process, the birefringence of the PP precursor could be as low as 0.0100. In another example, a membrane for the embossed battery separator with a >35% porosity from a polyethylene resin, the birefringence of the precursor may be >0.0280; while with the instant process, the birefringence of the PE precursor could be as low as 0.0240.

In some embodiments, the nonporous precursor can be one of a blown film and a slot die film. The nonporous precursor can be a single layer precursor formed by at least one of single layer extrusion and multilayer extrusion, or a multilayer precursor formed by at least one of co-extrusion and lamination Annealing (optional) can be carried out, in one embodiment, at temperatures between $T_m$-80° C. and $T_m$-10° C. (where $T_m$ is the melt temperature of the polymer); and in another embodiment, at temperatures between $T_m$-50° C. and $T_m$-15° C. Some materials (e.g., those with high crystallinity after extrusion, such as polybutene) may require no annealing.

Machine direction stretch can be conducted as a cold stretch or a hot stretch or both, and as a single step or multiple steps. In one embodiment, cold stretching may be carried out at <$T_m$-50° C., and in another embodiment, at <$T_m$-80° C. In one embodiment, hot stretching can be carried out at <$T_m$-10° C. In one embodiment, total machine direction stretching may be in the range of 50-500%, and in another embodiment, in the range of 100-300%. During machine direction stretch, the precursor can shrink in the transverse direction (conventional).

Transverse direction stretching can include a simultaneous controlled machine direction relax. This means that as the precursor is stretched in the transverse direction the precursor is simultaneously allowed to contract (i.e., relax), in a controlled manner, in the machine direction. The transverse direction stretching can be conducted as a cold step, or a hot step, or a combination of both. In one embodiment, total transverse direction stretching can be in the range of 100-1200%, and in another embodiment, in the range of 200-900%. In one embodiment, the controlled machine direction relax can range from 5-80%, and in another embodiment, in the range of 15-65%. In one embodiment, transverse stretching can be carried out in multiple steps. During transverse direction stretching, the precursor may or may not be allowed to shrink in the machine direction. In an embodiment of a multi-step transverse direction stretching, the first transverse direction step can include a transverse stretch with the controlled machine relax, followed by simultaneous transverse and machine direction stretching, and followed by transverse direction relax and no machine direction stretch or relax.

Optionally, the precursor, after machine direction and transverse direction stretching can be subjected to a heat setting, as is well known.

In some embodiments, the dry-stretch process can include the steps of: machine direction stretching followed by said biaxial stretching including said transverse direction stretching with simultaneous controlled machine direction relax, a second transverse direction stretching with simultaneous machine direction stretching, followed by optional transverse direction relax.

In some embodiments, the biaxial stretching step of the dry-stretch process includes the simultaneous biaxial stretching of a plurality of separate, superimposed, layers or plies of nonporous precursor, wherein none of the plies are bonded together during the stretching process.

In some embodiments, the biaxial stretching step of the dry-stretch process includes the simultaneous biaxial stretching of a plurality of bonded, superimposed, layers or plies of nonporous precursor, wherein all of the plies are bonded together during the stretching process.

Once formed, the microporous membrane can be embossed. Embossed, as used and described herein, may describe any embossing or calendering type process of the material, including, but not limited to, beetled, watered, embossed, schreiner, the like, combinations thereof, etc.

Methods of embossing polymer films are known in the art. Any suitable embossing method can be used. The microporous films can be embossed using heat and/or pressure to create compressed, translucent regions (e.g., partially crushed areas) that contrast with regions that retain their original thickness, porosity, and characteristic milky white color (the white color results from the scattering of light within the pores of the film).

The embossed regions can be imparted by one or more methods suitable for permanently embossing thin films. By way of example only, the compressed regions can be formed using heat and/or pressure as well as other methods such as ultrasonic energy and so forth. As a particular example, compression of selected regions of the microporous films can be achieved via the use of patterned roller assemblies such as are commonly used in point bonding processes. Point bonding generally refers to the process of mechanically compressing one or more layers at numerous small, discrete points. Desirably the layers are embossed by thermal point bonding which generally involves passing one or more layers to be bonded between heated rolls such as, for example, an engraved or patterned roll and a second roll. The engraved roll is patterned in some way so that the fabric is not bonded over its entire surface, and the second roll can either be flat or patterned.

In some embodiments, embossing can comprise embossing the microporous membrane or film using a patterned embossing roller. In these embodiments, the patterned embossing roller can impart an embossing pattern to the embossed microporous membrane. Said another way, in these embodiments, the embossing rollers can have engraved patterns on them, and the patterns can become stamped in to the embossed microporous membrane, where the end result is a raised or sunken pattern, depending on the roller (See, for example, FIG. 1).

In some embodiments, embossing the microporous membrane or film can comprise calendering, crushing or compressing the microporous membrane or film using unpatterned (e.g., smooth) embossing rollers. In these embodiments, the resulting embossed microporous membrane may not comprise an embossing pattern (e.g., the embossed microporous membrane can have a substantially constant thickness (e.g., ±15%, or ±10%) across the membrane).

In some embodiments, embossing the microporous membrane or film can comprise reducing the thickness of the microporous membrane. In these cases, the thickness of the embossed microporous membrane can be from 35% to 75% (e.g., from 35% to 55%, from 75% to 55%, from 40% to 30%, or from 70% to 65%) of the thickness of the microporous membrane or film, before embossing.

Also provided are articles, including battery separators (e.g., lithium battery separators, such as secondary lithium battery separators, lithium ion battery separators, and/or lithium metal battery separators), materials, textiles, composites, and laminates, comprising the embossed microporous membranes described herein.

The articles can include one or more of the embossed membranes described above. In some embodiments, the articles (e.g., battery separators) can be single-ply or multi-ply constructs comprising one or more of the embossed membranes described herein. Regarding the multi-ply embodiments, the embossed membranes can be one ply of the multi-ply construct, more than one ply of the multi-ply construct, or all of the plies of the multi-ply construct. If the membrane is less than all of the plies of the multi-ply construct, the multi-ply construct can be formed via a lamination process. If the membrane is all plies of the multi-ply construct, the multi-ply construct can be made via a lamination process or an extrusion process such as a co-extrusion process.

In one embodiment, a microporous membrane film alone can be calendered and/or embossed. In select embodiments, the microporous membrane film calendered and/or embossed alone to create the instant embossed microporous membrane battery separator may be a single ply film. In other select embodiments, the microporous membrane film calendered and/or embossed alone to create the instant embossed microporous membrane battery separator may be a bi-layer film. In other select embodiments, the microporous membrane film calendered and/or embossed alone to create the instant embossed microporous membrane battery separator may be a multi-ply film.

In another embodiment, the instant embossed microporous membrane battery separator may be a composite, laminate, or multi-layer separator or structure including at least one microporous membrane or film embossed with a nonwoven, including, but not limited to, a mesh, a spunbond nonwoven material, a meltblown nonwoven material, or some combination thereof. The nonwoven used in the instant embossed battery separator may be made from any desired material. In one embodiment, the nonwoven may be a polypropylene (PP) nonwoven, including, but not limited to, a PP spunbond nonwoven and/or a PP meltblown nonwoven. The microporous membrane or film and the nonwoven can be combined in any manner, including, but not limited to, through adhesive or thermal lamination, and/or the embossing or calendering process of the instant disclosure. In some embodiments, the embossed microporous membrane battery separator can further include a thin, pliable, polymeric sheet, foil, or film having a plurality of pores therethrough.

The improved physical attributes of the embossed microporous membranes can result in, for example, battery separators exhibiting improved strength and/or resistance to splitting and waterproof/breathable textiles exhibiting improved strength and/or resistance to splitting.

Also provided are batteries (e.g., lithium batteries) comprising the battery separators described herein. The batteries can comprise an anode, a cathode, and the battery separator comprising an embossed microporous membrane described herein disposed between the anode and the cathode.

A method of using the embossed microporous membrane battery separators for separating the anode and cathode of a battery is also provided. Methods can comprise positioning one or more of the embossed microporous membrane battery separators described herein between the anode and cathode of a battery (e.g., a lithium battery).

By way of non-limiting illustration, examples of certain embodiments of the present disclosure are given below.

EXAMPLES

All materials were characterized using the following methods unless otherwise stated. The thickness of membranes was measured with an Emveco model 210-A microgage bench micrometer according to the method described in ASTM D374-99 (2004) entitled "Standard Test Methods for Thickness of Solid Electrical Insulation," which is incorporated herein by reference in its entirety. The porosity of membranes was measured according to the method described in ASTM D2873-94 (1999) entitled "Standard Test Method for Interior Porosity of Poly(Vinyl Chloride) (PVC) Resins by Mercury Intrusion Porosimetry," which is incorporated herein by reference in its entirety. The tensile strength of membranes was measured according to the method described in ASTM D882-12 (2012) entitled "Standard Test Method for Tensile Properties of Thin Plastic Sheeting," which is incorporated herein by reference in its entirety. Pore size and aspect ratio measurements were obtained by the analysis of scanning electron microscopy (SEM) micrographs. % TD elongation at break refers to the percentage of extension of a test sample along the TD of the test sample measured at the maximum tensile strength needed to break the sample. % Shrinkage was measured by incubating a sample in an oven at 90° C. for 1 hour. Shrinkage was then measured in the MD and/or the TD. Puncture Strength is measured using Instron Model 4442 tensile tester according to the method described in ASTM D3763-14 entitled "Standard Test Method for High Speed Puncture Properties of Plastics Using Load and Displacement Sensors," which is incorporated herein by reference in its entirety. The Gurley of the membranes was measured by two methods. In the first method defined as the Japanese Industrial Standard Gurley (JIS Gurley), Gurley is measured using the OHKEN permeability tester. JIS Gurley is defined as the time in seconds required for 100 cc of air to pass through one square inch of film at constant pressure of 4.8 inches of $H_2O$. In the second method, ASTM Gurley is measured according to the method described in ASTM D726-94 (2003) entitled "Standard Test Method for Resistance of Nonporous Paper to Passage of Air," which is incorporated herein by reference in its entirety. ASTM Gurley is defined as the time in seconds required for 10 cc of air to pass through one square inch of film at constant pressure of 4.8 inches of $H_2O$. Unless otherwise stated, reference to the Gurley of a membrane in this disclosure refers to JIS Gurley.

The electrical resistance ("ER") of the membranes was determined by soaking a sample of the membrane having a known surface area in a 30% by weight, solution of KOH in water for 24 hours. The resulting sample was then disposed between working platinum electrodes (i.e., anode and a cathode) immersed in an electrolyte of a 30%, by weight, solution of KOH in water and a direct current of known amperage (e.g., 40 milliamperes) was passed through the cell between the electrodes. The potential drop across the film (E') was measured with an electrometer. The potential drop across the cell without the microporous film disposed therein (E) was also determined using the same current. The electrical resistance of the microporous film is then determined using the equation:

$$ER=((E'-E)A)/I$$

where A is the surface area of the exposed film, I is the current across the cell, ER is the electrical resistance of the membrane, and E' and E are as described above. Thermal shutdown was determined by measuring the ER of the membrane while the temperature is linearly increased. The shutdown temperature is defined as the temperature at which the ER increases thousand-fold. Generally, a thousand-fold increase in ER is sufficient for a battery separator membrane to stop thermal runaway in a battery. The rise in ER corresponds to a collapse in pore structure due to melting of the membrane.

The membranes described in the following examples were produced by conventional dry-stretched techniques, except as noted.

Example 1—Preparation of Microporous Membranes

Membrane 1

Polypropylene (PP) resin was extruded using a 2.5 inch extruder. The extruder melt temperature was 221° C. The polymer melt was fed to a circular die. The die temperature was set at 220° C. The polymer melt was cooled by blowing air. The extruded precursor had a thickness of 27 microns and a birefringence of 0.0120.

The extruded film was then annealed at 150° C. for 2 minutes. The annealed film was then cold stretched to 20% at room temperature, and then hot stretched to 228% and relaxed to 32% at 140° C. The machine direction (MD) stretched film had a thickness of 16.4 microns, and a porosity of 25%. The MD stretched film was then transverse direction (TD) stretched 300% at 140° C. with an MD relax of 50%.

The resulting finished film had a thickness of 14.1 microns, and a porosity of 37%. The TD tensile strength of finished film was 550 $Kg/cm^2$.

Membrane 2

Polypropylene (PP) resin was extruded using a 2.5 inch extruder. The extruder melt temperature was 220° C. The polymer melt was fed to a circular die. The die temperature was set at 200° C. The polymer melt was cooled by blowing air. The extruded precursor had a thickness of 9.5 microns and a birefringence of 0.0160. HDPE resin was extruded using a 2.5 inch extruder. The extruder melt temperature was 210° C. The polymer melt was fed to a circular die. The die temperature was set at 205° C. The polymer melt was cooled by air. The extruded precursor had a thickness of 9.5 microns and a birefringence of 0.0330.

Two PP layers and one PE layers were then laminated together to form a PP/PE/PP tri-layer film. The lamination roll temperature was 150° C. The laminated tri-layer film was then annealed at 125° C. for 2 minutes. The annealed film was then cold stretched to 20% at room temperature, and then hot stretched to 160% and relaxed to 35% at 113° C. The MD stretched film had a thickness of 25.4 microns, and a porosity of 39%. The MD stretched film was then TD stretched 400% at 115° C. with an MD relax of 30%.

The resulting finished film had a thickness of 19.4 microns and a porosity of 63%. The TD tensile strength of finished film was 350 $Kg/cm^2$.

Membrane 3

PP resin and HDPE resin were extruded using a co-extrusion die to form a PP/PE/PP tri-layer film. The extruder melt temperature for PP was 243° C., and the extruder melt temperature for PE was 214° C. Polymer melt was then fed to a co-extrusion die which is set at 198° C. The polymer melt was cooled by blowing air. The extruded film had a thickness of 35.6 microns.

The extruded precursor was then annealed at 125° C. for 2 minutes. The annealed film was then cold stretched to 45% at room temperature and hot stretched to 247% and relaxed to 42% at 113° C. The MD stretched film had a thickness of 21.5 microns and a porosity of 29%. The MD stretched film was then TD stretched 450% at 115° C. with 50% MD relax.

The resulting finished film had a thickness of 16.3 microns and a porosity of 59%. The TD tensile strength of finished film was 570 $Kg/cm^2$.

Membrane 4

PP resin and HDPE resin were co-extruded and MD stretched using the method described in Example 3. The MD stretched film was then TD stretched 800% at 115° C. with 65% MD relax.

The resulting finished film had a thickness of 17.2 microns and a porosity of 49%. The TD tensile strength of finished film was 730 $Kg/cm^2$.

Membrane 5

PP resin and PE resin were extruded using a co-extrusion die. The extruder melt temperature for PP was 230° C., and extruder melt temperature for PE was 206° C. The polymer melt was then fed to a co-extrusion die which was set at a temperature of 210° C. The polymer melt was then cooled by blowing air. The extruded film had a thickness of 36.0 microns.

The extruded precursor was then annealed at 105° C. for 2 minutes. The annealed film was then cold stretched to 20%, and then hot stretched at 105° C. to 155% and then relaxed to 35%. The MD stretched film was then TD stretched 140% at 110° C. with 20% MD relax.

The resulting finished film had a thickness of 14.8 microns and a porosity of 42%. The TD tensile strength of finished film was 286 Kg/cm$^2$.

Membrane 6

PP resin and PE resin were extruded using a co-extrusion die to form a PP/PE/PP tri-layer film. The extruder melt temperature for PP was 245° C., and extruder melt temperature for PE was 230° C. The polymer melt was then fed to a co-extrusion die which was set at a temperature of 225° C. The polymer melt was cooled by blowing air. The extruded film had a thickness of 27 microns and a birefringence of 0.0120.

The extruded precursor was then annealed at 115° C. for 2 minutes. The annealed film was then cold stretched to 22% at room temperature and hot stretched to 254% and relaxed to 25% at 120° C. (total machine direction stretch=251%). The MD stretched film had a thickness of 15 microns and a porosity of 16%. The MD stretched film was then TD stretched 260% at 130° C. with 50% MD relax, followed by a simultaneous MD and TD stretch of 50% and 216% in each direction at 130° C. Finally, the film was held fast in the MD (100%) and allowed to relax 57.6% in the TD at a temperature of 130° C.

The resulting finished film had a thickness of 7.6 microns and a porosity of 52%. The TD tensile strength of finished film was 513 Kg/cm$^2$.

Membrane 7

PP resin and PE resin were extruded using a co-extrusion die to form a PP/PE/PP tri-layer film. The extruder melt temperature for PP was 222° C., and the extruder melt temperature for PE was 225° C. The polymer melt was then fed to a co-extrusion die which was set at a temperature of 215° C. The polymer melt was cooled by blowing air. The extruded film had a thickness of 40 microns and a birefringence of 0.0110.

The extruded precursor was then annealed at 105° C. for 2 minutes. The annealed film was then cold stretched to 36% at room temperature and hot stretched to 264% and relaxed to 29% at 109° C. (total machine direction stretch=271%). The MD stretched film had a thickness of 23.8 microns and a porosity of 29.6%. The MD stretched film was then TD stretched 1034% at 110° C. with 75% MD relax.

The resulting finished film had a thickness of 16.8 microns and a porosity of 46%. The TD tensile strength of finished film was 1037 Kg/cm$^2$.

Membrane 8

A PP-based impact copolymer was extruded to form a film. The extruder melt temperature was 249° C. The polymer melt was fed to an extrusion die set at 215° C. The polymer melt was cooled by blowing air. The extruded film had a thickness of 34 microns and a birefringence of 0.0116.

The extruded precursor was then annealed at 154° C. for 2 minutes. The annealed film was then cold stretched to 30% at room temperature and hot stretched 190% and relaxed 61% at 140° C. (total machine direction stretch=159%). The MD stretched film had a thickness of 26 microns and a porosity of 40%. The MD stretched film was then TD stretched 260% at 150° C. with 50% MD relax, followed by a simultaneous MD and TD stretch of 50% and 216%, respectively, at 150° C.

Properties of Membranes 1-8

Table 1 summarizes the physical properties of Membranes 1-8. For purposes of comparison, the physical properties of two commercially available dry-stretched films are also included: A) CELGARD® 2400 (single ply polypropylene); and B) CELGARD® 2325 (tri-layer polypropylene/polyethylene/polypropylene).

TABLE 1

Summary of the physical properties of Membranes 1-8.

| Membrane | TD Stretching | Thickness (microns) | Porosity | TD Tensile Strength (kg/cm$^2$) | MD Tensile Strength (kg/cm$^2$) | MD/TD Tensile Strength Ratio |
|---|---|---|---|---|---|---|
| A | — | 25.4 | 37% | 160 | 1700 | 10.6 |
| B | — | 25.1 | 40% | 146 | 1925 | 13.2 |
| 1 | 300% | 14.1 | 37% | 550 | 1013 | 1.8 |
| 2 | 400% | 19.4 | 63% | 350 | 627 | 1.8 |
| 3 | 450% | 16.3 | 59% | 570 | 754 | 1.3 |
| 4 | 800% | 17.2 | 49% | 730 | 646 | 0.9 |
| 5 | 140% | 14.8 | 42% | 286 | 1080 | 3.8 |
| 6 | 418% | 7.6 | 52% | 513 | 1437 | 2.8 |
| 7 | 1034% | 16.8 | 46% | 1037 | 618 | 0.6 |
| 8 | 450% | 17 | 73% | 287 | 558 | 1.9 |

Example 2—Microporous Membranes Embossed with a Pattern

A commercially available 19 micron thick polypropylene microporous membrane (CG1) was embossed with a pseudorandom floral pattern using an embossing roll. The physical properties of the embossed membrane are summarized in Table 2 below. For purposes of comparison, the physical properties of two samples of CG1 are also included.

TABLE 2

Summary of the physical properties of an embossed microporous membrane.

|  | CG1 (sample 1) | CG1 (sample 2) | Embossed CG1 | Change vs. Sample 1 | Change vs. Sample 2 |
|---|---|---|---|---|---|
| Thickness (microns) | ≈19 | 19.9 | 13.1 | −30% | −34% |
| Puncture Strength (g) | 124 | 122 | 166 | +35% | +36% |
| MD Tensile Strength (kg/cm$^2$) | 560 | 378 | 846 | +51% | +124% |
| TD Tensile Strength (kg/cm$^2$) | 277 | 234 | 369 | +33% | +58% |

Figure 1:
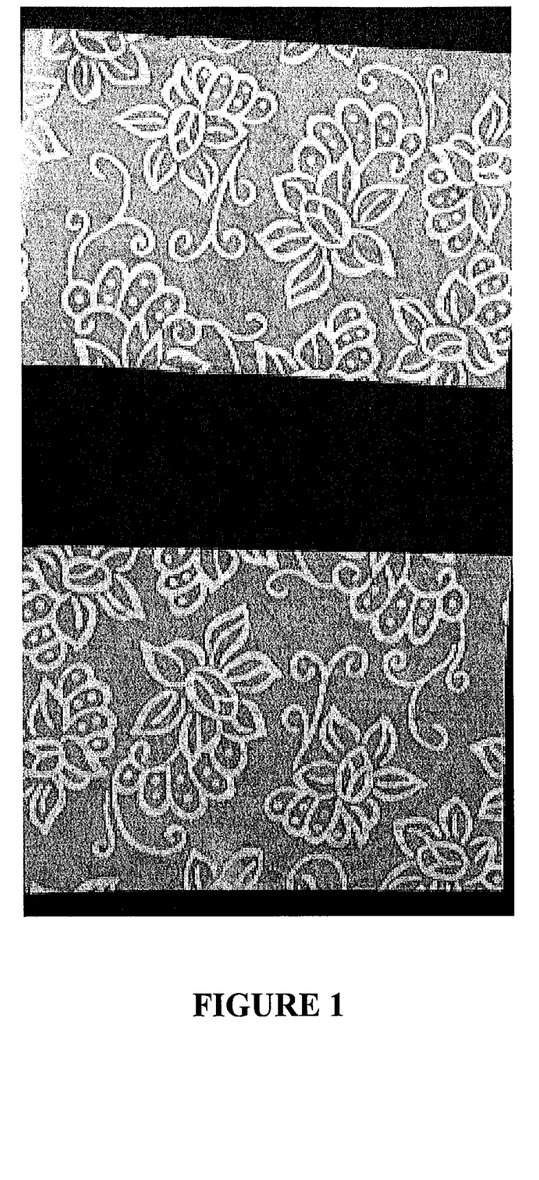
FIG. 1 is photograph illustrating example embossed microporous membranes embossed using a patterned roller.

The embossed membrane exhibited substantially improved machine direction (MD) tensile strength, transverse direction (TD) tensile strength, and puncture strength. In addition, embossing provided other benefits, including stronger edges and decreased MD splitting. As shown in FIG. 1, the embossing formed a visible pattern in the membrane. The white areas in the pattern are uncrushed regions of the membrane while the translucent (gray) areas in the pattern are partially crushed regions. The embossed membranes also exhibited a more fabric-like appearance.

Example 3—Microporous Membranes Embossed Using Unpatterned Embossing Rolls

A commercially available 15 micron thick polypropylene microporous membrane was embossed using unpatterned embossing rolls. Various process conditions, including nip pressure, nip temperature, and embossing roll temperature, were evaluated. All samples were embossed at a speed of 7.2 feet per minute, an unwind tension of 0 psi, and a rewind tension of 5 psi. The ASTM Gurley and thickness of the resulting membranes was evaluated. The results are included in Table 3 below.

TABLE 3

ASTM Gurley and thickness of membranes following embossing using unpatterned embossing rolls under different processing conditions.

| Membrane | Nip Pressure (psi) | Nip Temperature (° F.) | Embossing Roll Temperature (° F.) | ASTM Gurley (sec) | Rough Thickness (microns) |
|---|---|---|---|---|---|
| 9 | 25 | 70 | 300 | 1.30 | 14 |
| 10 | 50 | NR | 300 | 1.31 | 14 |
| 11 | 75 | NR | 300 | 1.41 | 14.5 |
| 12 | 100 | NR | 300 | 1.38 | 14.3 |
| 13 | 25 | NR | 320 | 1.40 | 14.5 |
| 14 | 50 | NR | 320 | 1.42 | 14 |
| 15 | 75 | 110 | 320 | 1.49 | 14 |
| 16 | 100 | 112 | 320 | 1.54 | 13 |
| 17 | 25 | 116 | 340 | 1.54 | 13 |
| 18 | 50 | 120 | 340 | 1.73 | 12.5 |
| 19 | 75 | 127 | 340 | 3.25 | 10 |
| 20 | 100 | 127 | 340 | 4.60 | 9 |
| 21 | 25 | 131 | 350 | 12.83 | 7 |
| 22 | 50 | 135 | 350 | >50 | — |
| 23 | 75 | 140 | 350 | — | — |
| 24 | 100 | 144 | 350 | — | — |

Based on these evaluations, membranes 19-22 were further analyzed.

Figure 2A:
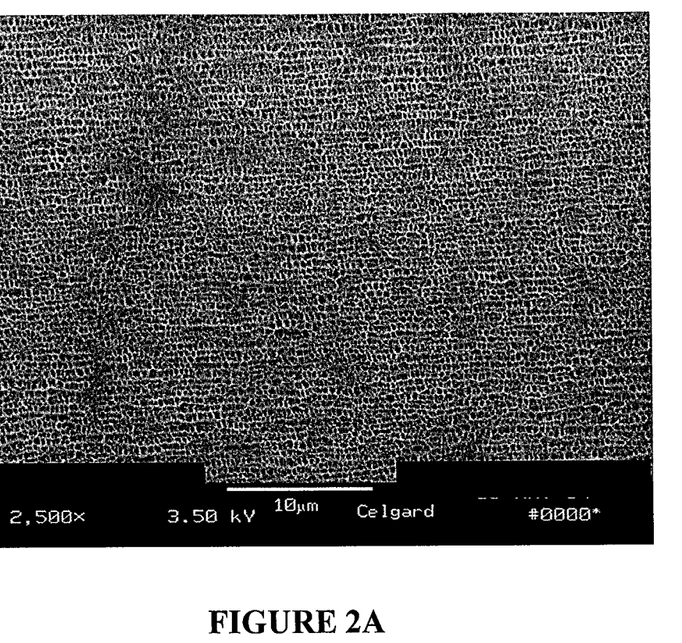
FIGS. 2A and 2B are scanning electron microscopy (SEM) images of both sides of a microporous membrane embossed using unpatterned embossing rollers.
Figure 2B:
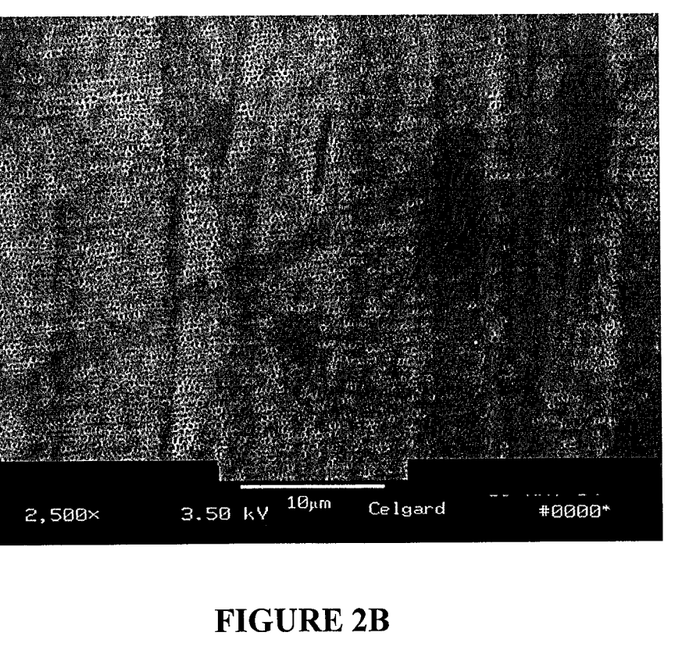

The physical properties of membranes 19-22 are summarized in Table 4 below. SEM images of both sides of membrane 21 are included in FIG. 2A and FIG. 2B.

TABLE 4

Summary of the physical properties of Membranes 19-22.

| Membrane | Average Thickness (microns) | Thickness Range (microns) | Puncture Strength (g) | MD Tensile Strength (kg/cm²) | TD Tensile Strength (kg/cm²) | JIS Gurley (sec) |
|---|---|---|---|---|---|---|
| 19 | 10.79 | 3.1 | 219 | 613.9 | 954.8 | 49.4 |
| 20 | 9.973 | 2.8 | 224.3 | 1072.98 | 677.4 | 85.1 |
| 21 | 7.34 | 6.1 | 228.7 | 1708.6 | 664.135 | 215.6 |
| 22 | 6.11 | 4.9 | 222.6 | 1847.9 | 813.3 | — |

A commercially available 15 micron thick trilayer polypropylene-polyethylene-polypropylene microporous membrane (CG2) was embossed using unpatterned embossing rolls. A total of 25 embossing conditions (EC1-EC25, Table 5 below) utilizing various nip pressures (ranging from 100 psi to 1300 psi) and nip temperatures (21° C., 54° C., 77° C., and 104° C.) were evaluated.

TABLE 5

Summary of embossing conditions (EC1-EC25).

| Nip Pressure | Nip Temperature | | | |
|---|---|---|---|---|
| | 21° C. | 54° C. | 77° C. | 104° C. |
| 100 | EC 1 | EC 9 | EC 17 | EC 25 |
| 200 | EC 2 | EC 10 | EC 18 | — |
| 400 | EC 3 | EC 11 | EC 19 | — |
| 600 | EC 4 | EC 12 | EC 20 | — |
| 800 | EC 5 | EC 13 | EC 21 | — |
| 1000 | EC 6 | EC 14 | EC 22 | — |
| 1200 | EC 7 | EC 15 | EC 23 | — |
| 1300 | EC 8 | EC 16 | EC 24 | — |

Based on these evaluations, EC1, EC2. EC3, EC4, EC9, and EC10 were selected for further analysis.

The physical properties of embossed membranes prepared using EC1, EC2. EC3, EC4, EC9, and EC10 are included in Table 6 below. The thermal shutdown behavior of membranes prepared using EC1, EC2. EC3, was EC4 was also evaluated. All four membranes exhibited a shutdown temperature of between 125° C. and 135° C.

TABLE 6

Summary of the physical properties of membranes prepared using EC1, EC2. EC3, EC4, EC9, and EC10.

| | EC1 | EC2 | EC3 | EC4 | EC9 | EC10 |
|---|---|---|---|---|---|---|
| JIS Gurley (sec) | 369.25 | 397 | 708.75 | 2191.5 | 730.25 | 1073 |
| Thickness (microns) | 11.4 | 12.5 | 10.4 | 10.4 | 9.3 | 10.2 |
| Max Thickness (microns) | 12.4 | 15.4 | 13.9 | 14.7 | 11.1 | 12.9 |
| Min Thickness (microns) | 10.1 | 9.1 | 8.1 | 8.3 | 7.1 | 8.3 |
| % MD shrinkage (90° C., 1 hour) | 8.94 | 9.48 | — | — | — | — |
| % TD shrinkage (90° C., 1 hour) | 5.08 | 4.99 | — | — | — | — |
| % MD shrinkage (120° C., 1 hour) | 20.95 | 20.2 | — | — | — | — |
| % TD shrinkage (120° C., 1 hour) | 15.48 | 15.12 | — | — | — | — |
| MD Tensile Strength (kg/cm²) | 1395.6 | 1136.2 | — | — | — | — |
| TD Tensile Strength (kg/cm²) | 845.93 | 659.28 | — | — | — | — |
| Puncture Strength (g) | 241 | 277 | — | — | — | — |

Figure 3A:
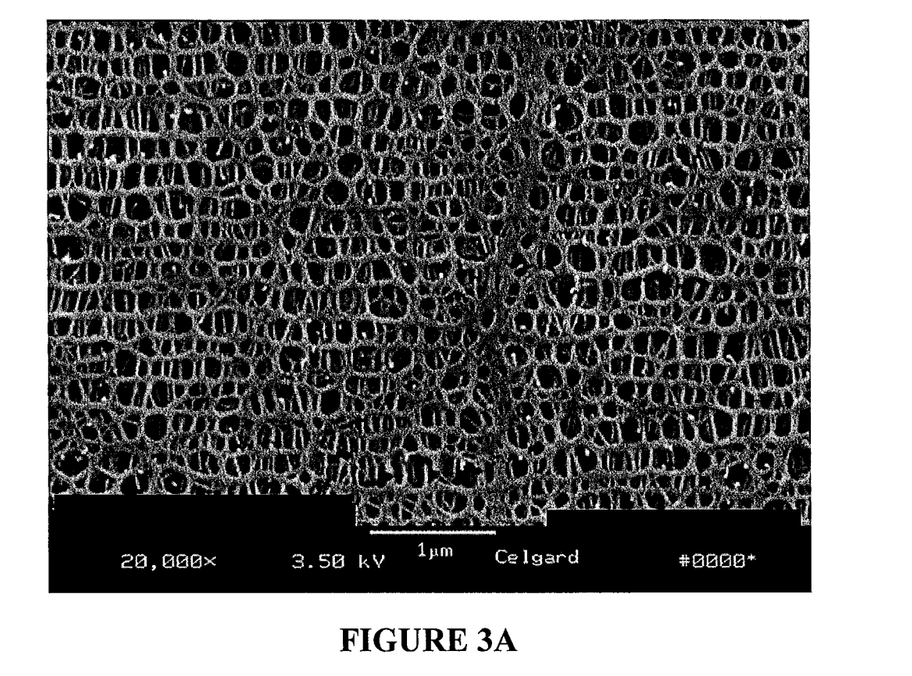
FIGS. 3A and 3B are SEM images of the surface (FIG. 3A) and cross-section (FIG. 3B) of a trilayer microporous membrane prior to embossing.
Figure 3B:
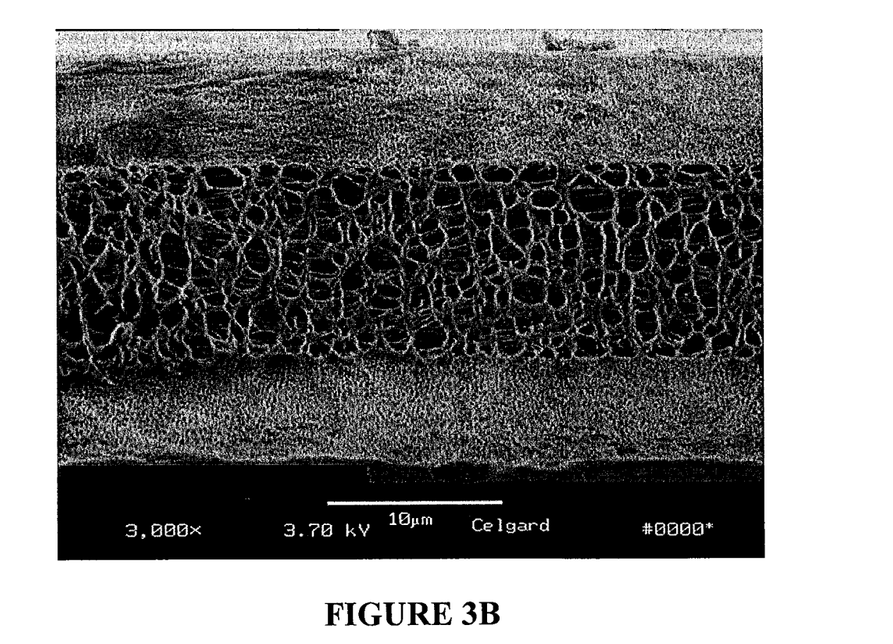
Figure 4A:
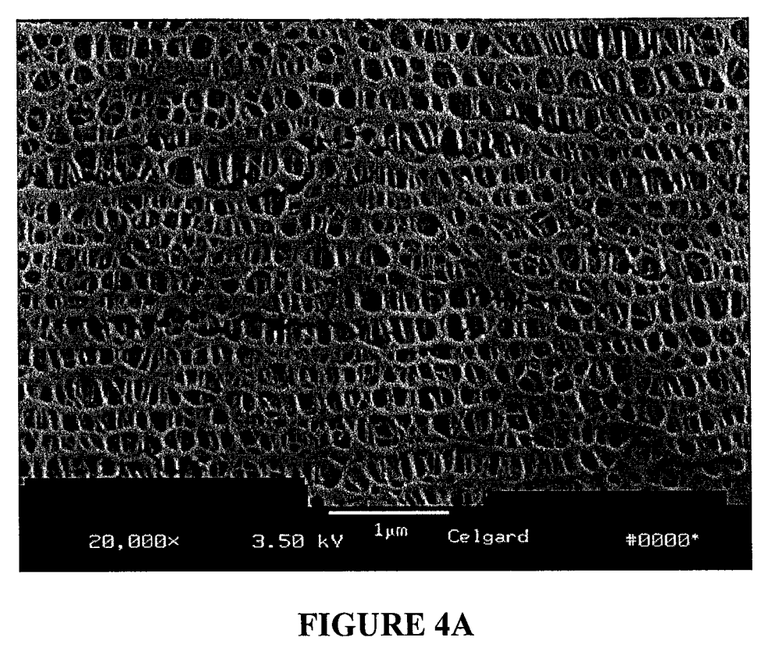
FIGS. 4A and 4B are SEM images of the surface (FIG. 4A) and cross-section (FIG. 3B) of a trilayer microporous membrane embossed using unpatterned embossing rollers.
Figure 4B:
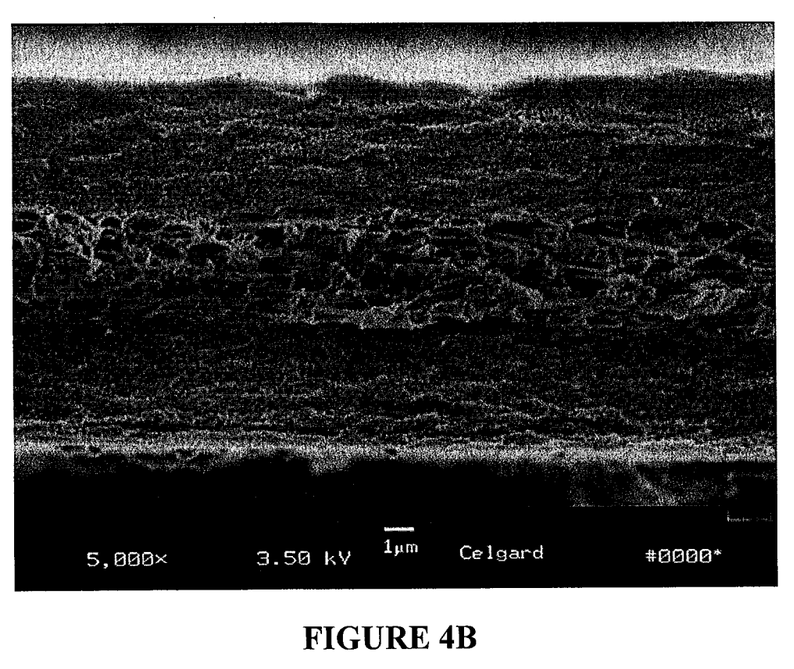

The physical properties of embossed membranes prepared using EC1 and EC4 were investigated further. The results are summarized in Table 7 below. For purposes of comparison, the physical properties of CG2 are also included. SEM images of a side and cross-section of CG2 are included in FIG. 3A and FIG. 3B. SEM images of a side and cross-section of an embossed membranes prepared using EC1 are included in FIG. 4A and FIG. 4B.

TABLE 7

Summary of the physical properties of
membranes prepared using EC1 and EC4.

|  | CG2 | EC1 | EC4 |
|---|---|---|---|
| Average Thickness (microns) | 27.4 | 11.9 | 9 |
| MD Tensile Strength (kg/cm$^2$) | 610 | 1175 | 1483 |
| TD Tensile Strength (kg/cm$^2$) | 286 | 648 | 770 |
| Puncture Strength (g) | 295 | 294 | 282 |
| % TD elongation at break | 103 | 88 | 100 |

In accordance with at least selected embodiments, aspects or objects, this application or invention relates to embossed or calendered battery separators, battery separator membranes or layers, microporous membrane battery separators, microporous membranes, composites or laminates, methods of manufacture, methods of use, products or systems including such separators, layers, membranes, composites, or laminates, and/or the like.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. An embossed microporous membrane within a battery separator, where the embossed microporous membrane is prepared by a process comprising embossing, calendering or compressing a microporous polymer film made by a dry-stretch process and including a plurality of pores having a substantially round shape,
wherein the microporous polymer film exhibits a ratio of machine direction (MD) tensile strength to transverse direction (TD) tensile strength of from 0.5 to 5.0; and
wherein the microporous polymer film is a triple-ply film having a PP/PE/PP configuration; and
wherein the embossing pattern comprises embossed horizontal lines running parallel to the TD of the membrane;
wherein the horizontal lines have a line width of from 2 microns to 10 microns.

2. The membrane of claim 1, wherein the embossed microporous membrane exhibits increased MD tensile strength, increased TD tensile strength, increased puncture strength, decreased MD splitting, or a combination thereof as compared to the microporous polymer film.

3. The membrane of claim 1, wherein the horizontal lines have a spacing in the MD of from one to ten times the line width.

4. The membrane of claim 1, wherein at least one of the PP layers comprises impact copolymer polypropylene.

5. The membrane of claim 1, wherein the plurality of pores has an average pore size of from 0.03 microns to 0.50 microns and an aspect ratio of from 0.75 to 1.25; and
wherein the microporous polymer film has a porosity of from 20% to 80% and a TD tensile strength of at least 175 kg/cm$^2$.

6. The membrane of claim 1, wherein the microporous polymer film has at least one of a porosity of from 65% to 90%, a JIS Gurley of less than 60 seconds, a mean flow pore diameter of at least 0.05 microns, an Aquapore size of at least 0.08 microns, a TD tensile strength of at least 225 kg/cm$^2$, a thickness of from 8 microns to 80 microns, a TD shrinkage of less than 6.0% at 90° C. and a TD shrinkage of less than 15.0% at 120° C.

7. The membrane of claim 1, further comprising a nonwoven disposed on at least one side of the embossed microporous membrane.

8. An embossed microporous membrane within a battery separator, where the embossed microporous membrane comprises an embossed microporous polymer film, wherein the embossed microporous polymer film is a dry-stretch process film, has a thickness of from 2 microns to 20 microns, a porosity of from 20% to 65%, a JIS Gurley of 500 or less, and a ratio of MD tensile strength to TD tensile strength of from 0.5 to 5.0 wherein the microporous membrane is a triple-ply film having a PP/PE/PP configuration; and
wherein the embossing pattern comprises embossed horizontal lines running parallel to the TD of the membrane;
wherein the horizontal lines have a line width of from 2 microns to 10 microns.

9. The membrane of claim 8, wherein the embossed microporous polymer film has at least one of a thickness of from 3 microns to 12 microns, a porosity of from 25% to 50%, a JIS Gurley of from 80 seconds to 500 seconds, a TD shrinkage of less than 6.0% at 90° C. and less than 15.0% at 120° C., a puncture strength of from 200 g to 325 g, a TD tensile strength of at least 250 kg/cm$^2$, and an MD tensile strength of from 1000 kg/cm$^2$ to 2000 kg/cm$^2$.

10. The membrane of claim 8, further comprising a nonwoven disposed on a side of the embossed microporous polymer film.

11. A battery comprising an anode, a cathode, and the battery separator of claim 1 disposed between the anode and the cathode.

* * * * *